United States Patent
Allison et al.

(10) Patent No.: US 7,055,035 B2
(45) Date of Patent: May 30, 2006

(54) METHOD FOR GENERATING A READ ONLY MEMORY IMAGE

(75) Inventors: Michael S Allison, Fort Collins, CO (US); Stephen Silva, Fort Collins, CO (US); Stephen Patrick Hack, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 822 days.

(21) Appl. No.: 09/918,974

(22) Filed: Jul. 31, 2001

(65) Prior Publication Data

US 2003/0028772 A1 Feb. 6, 2003

(51) Int. Cl.
*H04L 9/00* (2006.01)

(52) U.S. Cl. .......................... 713/176; 713/1; 711/102

(58) Field of Classification Search ................ 713/1–2, 713/100, 176, 200, 164, 187; 711/102–103
See application file for complete search history.

(56) References Cited

U.S. PATENT DOCUMENTS

| | | | | |
|---|---|---|---|---|
| 5,235,551 A | * | 8/1993 | Sinofsky et al. | 365/230.01 |
| 5,623,604 A | * | 4/1997 | Russell et al. | 717/167 |
| 6,000,005 A | * | 12/1999 | Yamada | 711/103 |
| 6,092,189 A | * | 7/2000 | Fisher et al. | 713/1 |
| 6,223,284 B1 | * | 4/2001 | Novoa et al. | 713/100 |
| 6,523,125 B1 | * | 2/2003 | Kohno et al. | 713/320 |
| 6,715,074 B1 | * | 3/2004 | Chaiken | 713/164 |

* cited by examiner

*Primary Examiner*—Emmanuel L. Moise
*Assistant Examiner*—MinhDieu Nguyen (57) ABSTRACT

A system and method generate a read only memory (ROM) image for a ROM. The ROM image generator operates with a data image builder. The ROM image generator processes an input file to identify data images for a build. The image identifier generates tokens for building each data image. A data image builder uses the tokens as an input to build each data image. A ROM image builder builds the ROM image using each data image build and generates a data image build validating signature for each data image build, such as a checksum. Once each data image build and associated validating signature is written to the ROM image, the ROM image is completed with a checksum of the entire ROM image.

6 Claims, 7 Drawing Sheets

METHOD FOR GENERATING A READ ONLY MEMORY IMAGE

FIELD OF THE INVENTION

The present invention relates to the field of generating a read only memory image.

FIELD OF THE INVENTION

The present invention relates to the field of generating a Read Only Memory (ROM) image. The invention is particularly useful for generating an image file for programming ROMs or other memory devices, such as Programmable ROMs (PROMs), Erasable Programmable ROMs (EPROMs), and Electrically Erasable Programmable ROMs (EEPROMs) that store firmware in a system.

BACKGROUND OF THE INVENTION

Firmware is code that executes for a computing system that is rarely changed. Some firmware operates at the time of power up to the time a processor boots. Other firmware includes real-time code that operates various peripherals or otherwise continues processing for the computing system. Firmware may, for example, test the health of a computing system on which it resides. This firmware often resides within memory, such as one or more of a read only memory (ROM), a Programmable ROM (PROM), an Erasable Programmable ROM (EPROM), and/or an Electrically Erasable programmable ROM (EEPROM).

The ROM has executable files and associated data sometimes referred to as images. These images are written to the ROM or otherwise stored as a "build" process.

A ROM image is a file or other executable code and/or data stored on a memory, such as a ROM, a PROM, an EPROM, or an EEPROM. The ROM image contains one or more data images that are compiled and linked to create the ROM image. The data images may be a section of executable code, data for use by a compiled program, an output of a compiled program, a section of data or code that can be transferred to a programmable device, a section of code or data for use by a system having a specific configuration, or other code or data useful for operation of the computer system.

Each data image in the build has a starting address and an initial memory size. However, throughout the life of the computing system, the size of one or more data images in the ROM image may increase. This may occur, for example, if the code written to the data image is increased or otherwise modified when bugs are fixed, additional features are added to the system, or the firmware otherwise is changed.

In prior systems, ROM images were built manually by fixing a series of addresses for data images to be placed in the ROM image. Because the data image may increase in size, gaps were left between data images to provide for their expansion. If the size of a data image increased too greatly so that it would require space already taken by another data image, then that expanded data image as well as other data images were moved manually to compensate for the expanded size. This manual movement of data images was time consuming and error prone.

In addition, in the prior art, a single checksum or a single cyclic redundancy check (CRC) existed for the entire ROM image. Thus, all data images in a ROM programmed with the ROM image had to be checked so that the checksum or CRC may be computed, even if one or more data images or a portion of the ROM was not used in the execution of the firmware. For a large ROM, this added a significant amount of time to boot the system.

Thus, new systems and methods are needed to reduce the problems associated with validating data images, the ROM image, and a ROM programmed with the ROM image, thereby reducing the boot time. In addition, new systems and methods are needed to easily write data images to a ROM image and subsequently confirm sizes and addresses of those data images. Moreover, new systems and methods are needed to provide validations, such as checksums or CRCs, for selected data images and the ROM images.

SUMMARY OF THE INVENTION

The present invention is directed to a method for generating a ROM image comprising at least one data image build. The method comprises processing an input file to identify at least one data image for a ROM image build and to generate a token file comprising at least one token for the data image. The data image is processed with its associated token file to create the data image build. A data image build validating signature is generated for the data image build. The data image build and the data image build validating signature are written to the ROM image. A ROM image validating signature is generated for the ROM image.

Further, the present invention is directed to a method for generating a ROM image comprising at least one data image build. The method comprises processing an input file to generate a token file and a temporary token file, the token file and the temporary token file each representing tokens for each data image identified in the input file. The token file is compared with the temporary token file and, if the same, a data image validating signature is generated for each data image. Each data image and each data image validating signature are written to the ROM image, and, thereafter, a separate ROM image validating signature is generated for the ROM image.

Still further, the present invention is directed to a method for generating a ROM image using inputs from an input file. The method comprises identifying a plurality of data images to be placed in the ROM image based upon the inputs from the input file. A data image validating signature is generated for each data image with each associated input. Each data image and data image validating signature is written to a starting address of the ROM image. At least one starting address is dynamically allocated. Thereafter, a ROM image validating signature is generated for the ROM image. The data images with the data image validating signatures and the ROM image validating signature are transmitted to the memory for storage as the ROM image.

DETAILED DESCRIPTION OF THE PREFERRED EMBODIMENTS

In one embodiment, the present invention provides systems and methods for building a memory image, such as a read only memory (ROM) image, in which one or more data images, associated addresses, associated sizes of data bytes, and validating results exist. This embodiment automates the creation of the ROM image and reduces the boot time of the ROM image by reducing the time to validate each data image within the ROM image.

A ROM image is a file or other executable code and/or data stored within a memory, such as a ROM, a Programmable ROM (PROM), an Erasable Programmable ROM (EPROM), and/or an Electrically Erasable Programmable ROM (EEPROM). A ROM image may be viewed as a binary file that is programmed into a programmable memory device, such as a permanent or semi-permanent memory. A programming system is a system for transferring the ROM image to a ROM, a PROM, an EPROM, an EEPROM, and/or other memory.

Data images are compiled and linked to create the ROM image. Data images each may be a section of executable code, data for use by executable code, a compiled program, a section of data or code that can be transferred to a programmable device such as Field Programmable Gate Array (FPGA) configuration code, a section of code or data for use by a system having a specific configuration, or other code or data useful for operation of a computer system. The term "ROM" may include or be substituted with a memory, such as with one or more of a PROM, an EPROM, and/or an EEPROM.

A user may change a configuration file to add or delete data images for the ROM image. As such, the invention may be configured to add code to a ROM image, to remove code from a ROM image, or to not add code to a ROM image based upon user requirements or other requirements identified in a configuration file.

Data image starting addresses may be designated within the ROM image. The starting addresses may be fixed, or the size of a data image may be calculated, and a starting address may be generated dynamically for that data image.

In the preferred embodiment, the invention automatically relocates a data image in the ROM image, where needed, and automatically generates a new starting address for the data image. It also may automatically write the data image to the ROM image. A data image may be moved or modified as the data image grows, and the data image otherwise may be appended, as needed. Therefore, gaps between data images are not required. This results in a savings of space on the ROM and provides for a more efficient storage, retrieval, and execution of the ROM image. Moreover, checksums or other validating signatures do not have to be calculated or executed for empty space.

The invention may be configured to append bytes to an end of a data image so that the data image corresponds to an even multiple of a specified value of bytes. For example, a configuration file can specify that data images are to end on a four-byte boundary. Accordingly, one or more bytes will be appended, if needed, to a data image so that it ends on a four byte boundary, and thereby is of length equal to an even multiple of four bytes. This provides certain advantages, such as when completing checksums and some other algorithms that require a particular word length.

The invention may also create a token file. The token file generally is a text string with data that can be used during a ROM image build. The token file may include a list of tokens, such as a checksum, data images of the ROM, and/or other data.

In the preferred embodiment, the invention uses validating signatures, such as checksums. The validating signature is, for example, a computation based on data in an image, such as a checksum, a cyclic redundancy check (CRC), or some other validating process. A validating signature also may be computed based upon both data in the image and an identifying key as known in the art of digitally signed documents, such as a private key for use with a public key encryption algorithm. In some embodiments, a portion of the validating signature may be masked, or ignored. For example, a computed validation signature may be 64 bits. In this example, the upper 32 bits of that 64 bit signature may be masked so that the lower 32 bits are used for validating.

Figure 1:
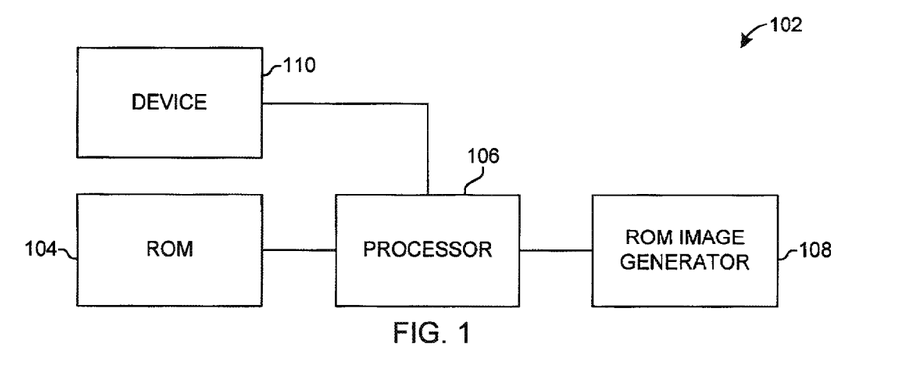
FIG. 1 is a block diagram illustrating a ROM image generating system in accordance with an embodiment of the present invention.

FIG. 1 depicts an exemplary embodiment of a ROM image generating system of the present invention. The image generating system 102 of FIG. 1 comprises a Read Only Memory (ROM) 104, a processor 106, and a ROM image generator 108. The image generating system 102 may include a device 110.

The ROM 104 is, for example, memory within digital media, a chip set, or another non-volatile storage device. The ROM 104 may be Programmable, Erasable, Electrically Erasable, or another type of ROM or memory.

The processor 106 is a processor configured to process the ROM image generator 108. The processor 106 may be configured to control other internal or external devices associated with the image generating system 102. For example, the processor 106 may be configured to operate an input/output device or a programmable device.

The ROM image generator 108 is configured to identify data images for a ROM image build. The ROM image then is constructed based upon the data images.

The device 110 is an internal or external device associated with the image generating system 102. The device 110 may be, for example, a media reading or writing device, such as a compact disk (CD) ROM, a volatile memory, a non-volatile memory, a programmable device, an input device, an output device, or another device.

Figure 2:
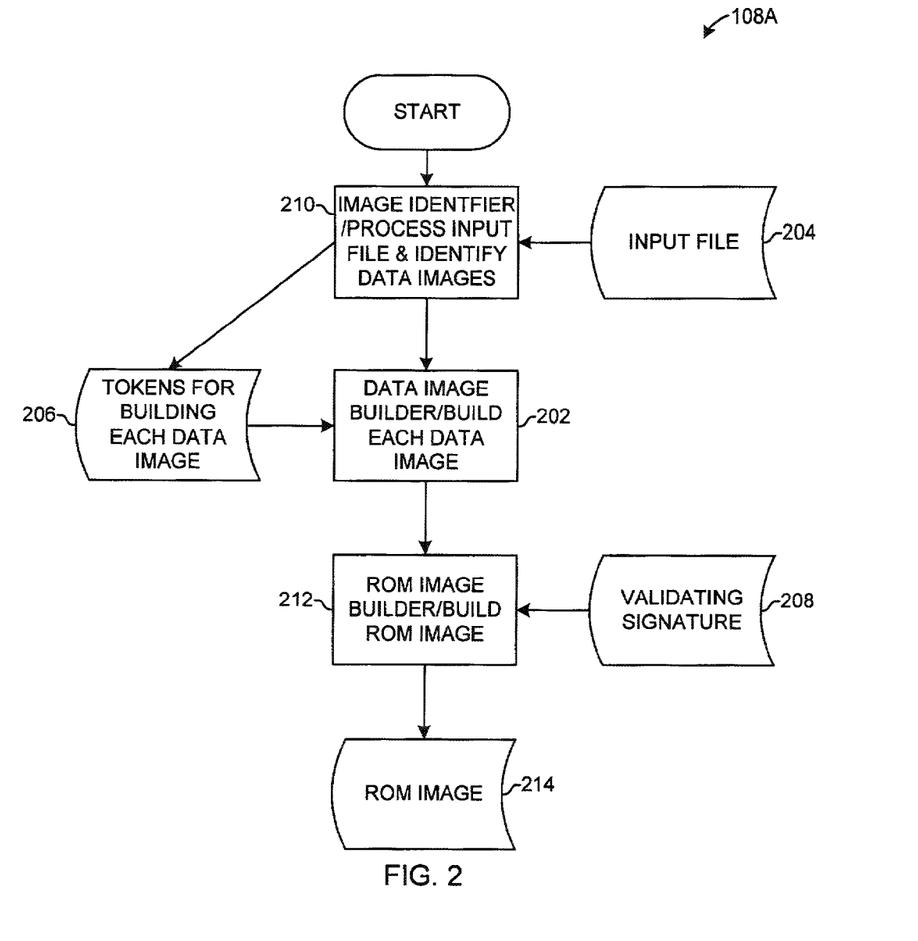
FIG. 2 is a flow diagram illustrating ROM image generation in accordance with an embodiment of the present invention.

FIG. 2 depicts an exemplary embodiment of a ROM image generator process 108A operating with a data image builder process 202. The ROM image generator process 108A and the data image builder process 202 may use an input file 204, image tokens 206, and a validating signature 208 for each data image.

An input file 204 is communicated to an image identifier process at step 210 to identify data images for a build. Image tokens 206 are added, and each data image is constructed by a data image builder process at step 202. At step 212, a validating signature 208 for each data image is added, and a ROM image 214 is constructed by a ROM image builder process.

Each process has one or more associated program modules configured to carry out the process. Thus, the ROM image generator process 108A, data image builder process 202, image identifier process 210, and ROM image builder process 212 have an associated ROM image builder, data image builder, image identifier, and ROM image builder, respectively. It will be appreciated that more than one program module may be associated with each process. For example, the image identifier process 210 may have an associated first image identifier and a second image identifier in which one or more of the image identifier processes are completed.

An explanation of embodiments of the input file 204, the image tokens 206, and the validating signature 208 are immediately below, followed by a more extensive description of the ROM image generator process 108A at each step thereof for one embodiment. Other embodiments exist.

The input file 204 may be a configuration file identifying tokens or other inputs for each build. The input file contains the information needed to build a ROM image 214 for various configurations. Thus, the information in an input file may vary for a particular ROM image build 212. In one embodiment, the input file includes a ROM image starting address, a ROM image size, the size of a checksum, CRC, or other validating signature, a mask for the validating signature, a validating signature program identifier, and/or a fill pattern for unused locations in the ROM image.

The validating signature program identifier may be a file name of a program used to compute the validating signature. The validating signature may be a checksum, a CRC, a result of a key-based encryption algorithm, or another validating signature.

A fill pattern may identify a method for which a data image may be aligned. The data image may have an alignment value, such as an alignment pad specifying the number of bytes that are to be added to a data image for it to align as required with the fill pattern. Alternately, the alignment value may specify the byte value at which the data image should end. For example, the fill pattern may specify that a data image should contain an even multiple of the length, or a defined portion of the length, of the fill pattern. Alternately, a fixed alignment value may be set for each data image. For example, the alignment value then may be set to two bytes, and zero or one bytes would then be added to the data image to ensure it occupies an even multiple of two bytes.

The fill pattern and the alignment value aid in the real-time computation of a validating signature so that the run-time algorithm can make assumptions on the size of a data image. For example, a checksum algorithm can assume that a data image size is a multiple of 64-bit words.

In addition, the input file 204 may contain information enabling each data image to be placed into the ROM image. The information for each data image may include a file name, a starting address within the ROM image at which the data image may be written, an address or other location within the ROM image at which a validating signature may be stored, a location in the ROM image at which a starting address of the data image is stored, the validating signature size and/or mask, and/or an alignment value for a data image.

The starting address within the ROM image may be fixed or dynamically identified. If the starting address is dynamically identified, a dynamic identifier having a particular value such as "−1" may be specified in the input file. If a validating signature is not required, then a null validating signature identifier may be used, such as a "−1". If the starting address of a data image is to be ignored, then a null starting address identifier, such as a "−2", may be used. With regard to the checksum size and/or mask, after the checksum or other validating signature is computed for the data image, a mask may be XORed or ANDed with the checksum. Those skilled in the art should appreciate that other identifiers, such as dynamic identifiers, signature identifiers, and starting address identifiers, may be used without departing from the scope of the invention.

Image tokens 206 for building a data image may come from an input file or other source. An image token 206 may include one or more of a starting physical address for the ROM image, the size of the ROM image, a data byte value of unused ROM image locations, and/or the address of the overall ROM image validating signature, such as the ROM image checksum. Other tokens may include the address where the starting address of the ROM image is stored, the address where the size of a data image is stored, an address at which a validating signature for a data image is stored, a size of a validating signature, a mask for a validating signature, and/or an word size of data read by a processor when validating a data image against a validating signature. The image tokens 206 are generated to a token file or a temporary token file.

The validating signature 208 is used to validate each data image. The validating signature identifier may identify an algorithm used to generate the validating signature. A checksum or CRC algorithm can be used to generate the validating signature in particular embodiments.

Referring still to FIG. 2, the steps in the ROM image generator process now will be more extensively described for a preferred embodiment. At step 210, the image identifier processes an input file to identify data images for a ROM build. The input file 204 identifies the tokens 206 that specify the data images to be included in the ROM image.

For each data image, the input file 204 specifies whether or not the ROM image generator process 108A is to dynamically identify the starting address. If the starting address of the data image is fixed, the input file identifies the starting address. In addition, the input file may identify optional parameters specified above. When the input file is processed, the token file having the tokens 206 for each data image to be in the ROM image will be created.

In the data image build step 202, the data image builder builds each data image using the tokens 206 identified in the token file for that data image. The data image build step 202 includes compiling and linking each data image using the identified tokens.

At step 212, the ROM image is constructed by placing each data image with an assigned starting location to that location in the ROM image. Each data image that is not assigned a starting location is assigned a free location in the ROM image. If a starting address, size, or validating signature is requested for any data image, these also are placed in the ROM image. Thus, each data image and the ROM image may have separate validating processes, which may be set by user input of validating signature programs that will calculate the validating signatures 208.

At steps 210 and 212, the image identifier and the ROM image builder validate the ROM image 214 by testing that there is no overlap between the data images. Therefore, after building all of the data images and the ROM image 214, the ROM image generator process 108A preferably repeats to confirm that the ROM image 214 was built accurately. In the second execution, a temporary token file is created and compared to the token file that was created in the first execution. If the token file and the temporary token file are the same, the ROM image was built accurately, as will be described more completely below. The second execution also validates that the tokens for each data image are consistent, and it computes the validating signatures for each data image, if specified, and for the entire ROM image 214.

In one embodiment, the ROM image 214 is validated using a validating signature 208 generated at step 212. However, since blank space is not a part of the ROM image 214, the entire ROM image does not require validating. Rather, only what is used within the ROM is validated, enabling the ROM image to grow and saving run-time execution.

It will be appreciated that more than one program module may be associated with each process. For example, at step 210, a first image identifier generate the token file, and a second image identifier may generate the temporary token file. The processes and modules may be distributed or combined in various embodiments.

Figure 3:
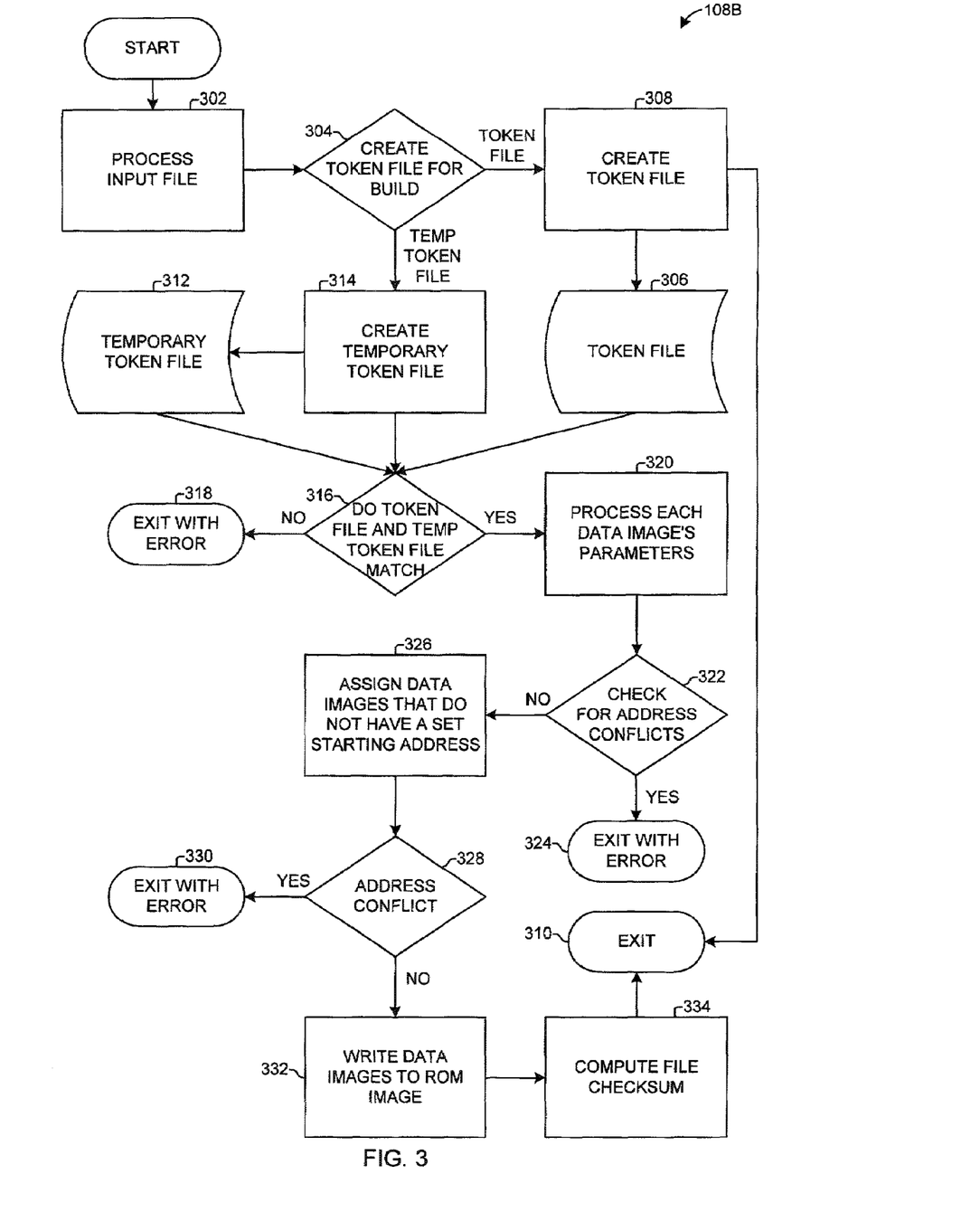
FIG. 3 is a flow diagram illustrating ROM image generation in accordance with a further embodiment of the present invention.

FIG. 3 depicts an exemplary embodiment of another ROM image generator process 108B. In this embodiment, the ROM image generator process 108B is called twice. The first call is completed before the ROM image build and is used to create a token file for the ROM image build. The second call is completed after the ROM image build and is used to create a temporary token file. The token file is compared to the temporary token file to confirm the accuracy of the ROM image and to guarantee that the data images in the ROM image are consistent with what is expected.

For example, if a ROM image is built, and a configuration file for the ROM image is altered while the ROM image is being generated, then the ROM image would not accurately identify data images for the ROM image. In such an instance, the token file will be different than the temporary token file since the token file will be created before the configuration file is modified, and the temporary token file will be created after the configuration file is modified. If the token file is not the same as the temporary token file, the process may be configured to exit and restart. Alternately, the process may be configured to restart without exiting.

The ROM image generator process 108B of FIG. 3 may be altered so that only a single call is made. However, the two-call process ensures an accurate ROM image.

When a token file or a temporary token file is created, the data from the input file is read and written to the token file or to the temporary token file. The data in the token file is used to build the ROM image. For example, if the ROM image build is based on a C code source file, the token file includes a header file with #defines used to list the parameters. The ROM image generator process 108B checks for the existence of the #defines to add or remove run-time code when the ROM image is built. The ROM image generator process 108B also may use the #defines to determine, for example, data image locations, checksums, and sizes of data images within the ROM image.

Referring now to the process depicted in FIG. 3, the ROM image generator process 108B processes an input file at step 302. The input file is read to obtain input information to build the ROM image. The input file information may include the ROM image starting address, the ROM image size, a fill pattern and alignment value, a size of a checksum for the ROM image, and a checksum identifier. A mask for a checksum also may be included. The input file is read for each data image to determine the file name of the data image, the starting address of the data image within the ROM image, the location in the ROM image to store the checksum for that data image, the location in the ROM image to store the starting address of the data image, the checksum size for the data image, and the alignment value for the data image.

Step 304 determines if a token file should be created for the ROM image build. If this is the first call of the ROM image generator process 108B, so that the ROM image has not yet been built, a token file 306 is created at step 308. The process exits at step 310, and the ROM image is built. If this is the second call to the ROM image generator process 108B, i.e. when the ROM image already has been built, then a temporary token file 312 is created at step 314.

Once the token file 306 and the temporary token file 312 are created, the build of the ROM image starts with a comparison of the token file 306 and the temporary token file 312 at step 316. If the token file 306 and the temporary token file 312 match, then the original ROM image build and the current determination of the token file are the same. Thus, no data image has been added, modified, or deleted, and no other changes have been made, such as to a configuration file. If the token file and the temporary token file do not match, then a data image has been added, modified, or deleted or some other modification has occurred after the build.

Figure 4:
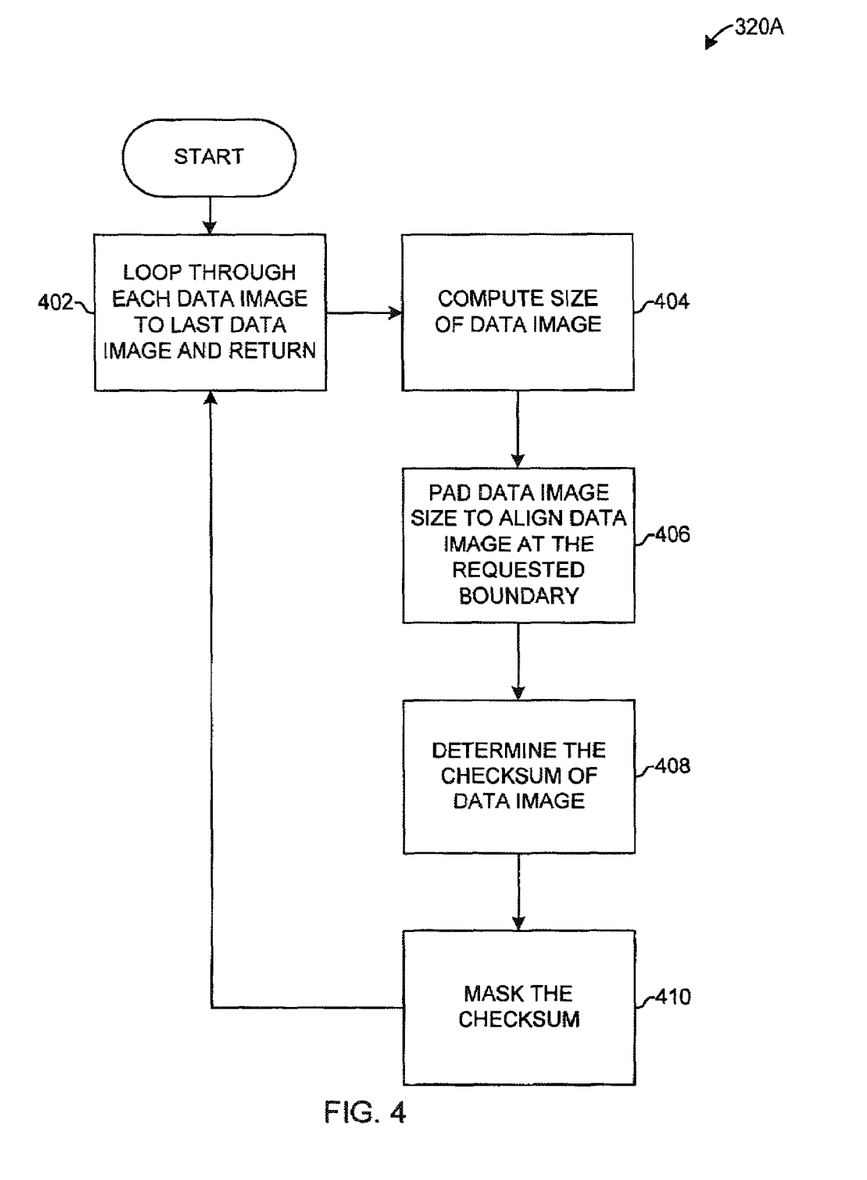
FIG. 4 is a flow diagram illustrating a data image parameter process in accordance with an embodiment of the present invention.

If the token file and the temporary token file do not match at 316, the process exits with an error at step 318. An error message optionally may be generated to an output device. If the token file and the temporary token file match at step 316, each data image is processed at 320 to determine the data image size and to validate the data image, such as with a checksum or a CRC. An alignment value may be added (step not shown) to the data image so that a validating algorithm can assume the boundary size limits on the data image when computing the validating signature. FIG. 4 depicts an exemplary embodiment of a data image parameter process.

Figure 5:
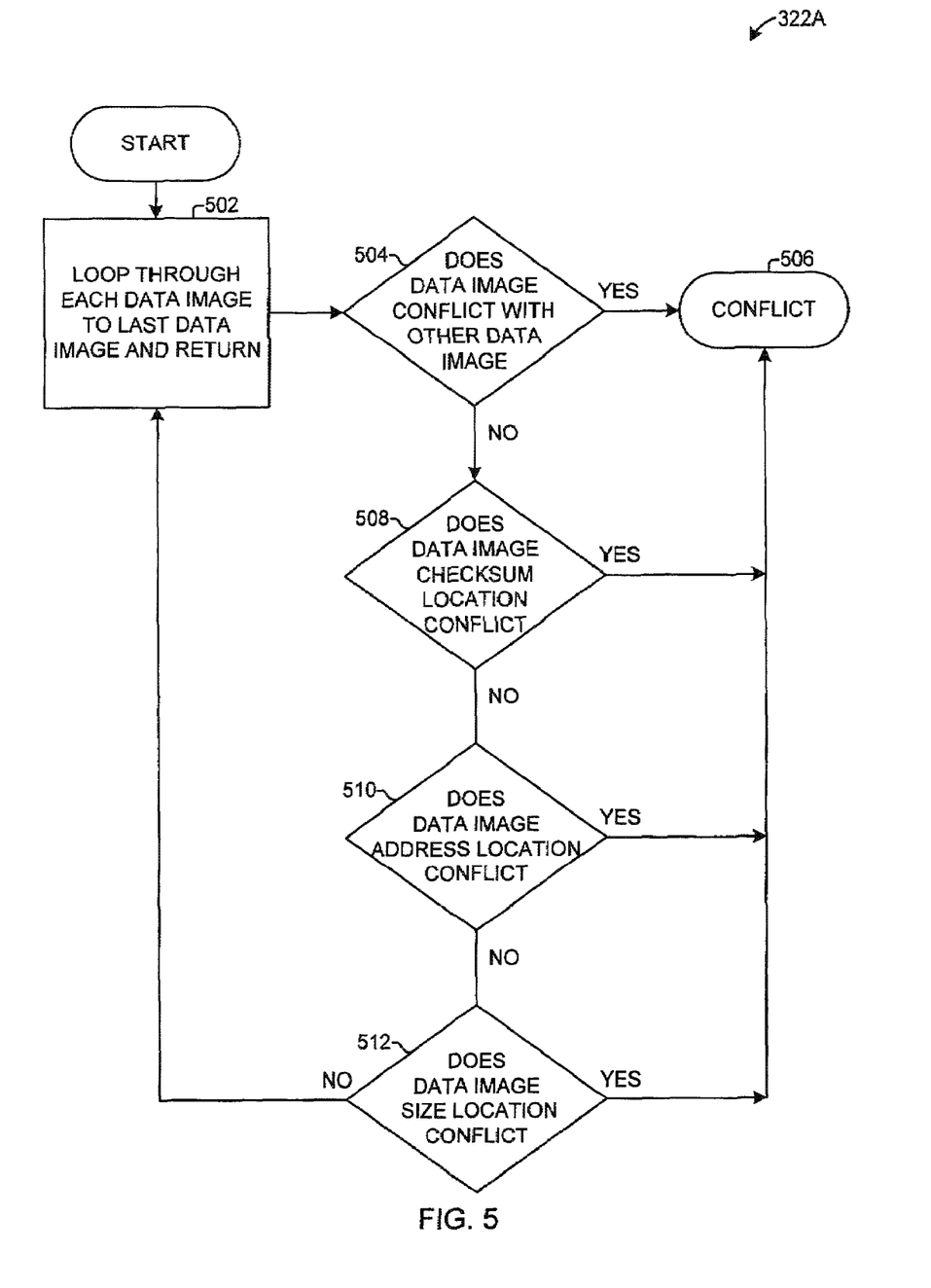
FIG. 5 is a flow diagram illustrating a data image address conflicts process in accordance with an embodiment of the present invention.

Address conflicts are checked at step 322 to determine if the data image address location and size conflict with any other data image. The data image parameters are compared to all other data images and their associated parameters to determine if a location in the ROM image is occupied by more than one data image or that data image's associated parameters. If a location in the ROM image is being used by more than one data image at a time, an error exists. Thus, if an address conflict exists at step 322, the process exits with an error at step 324. FIG. 5 depicts an exemplary embodiment of an address conflict checking process.

Figure 6:
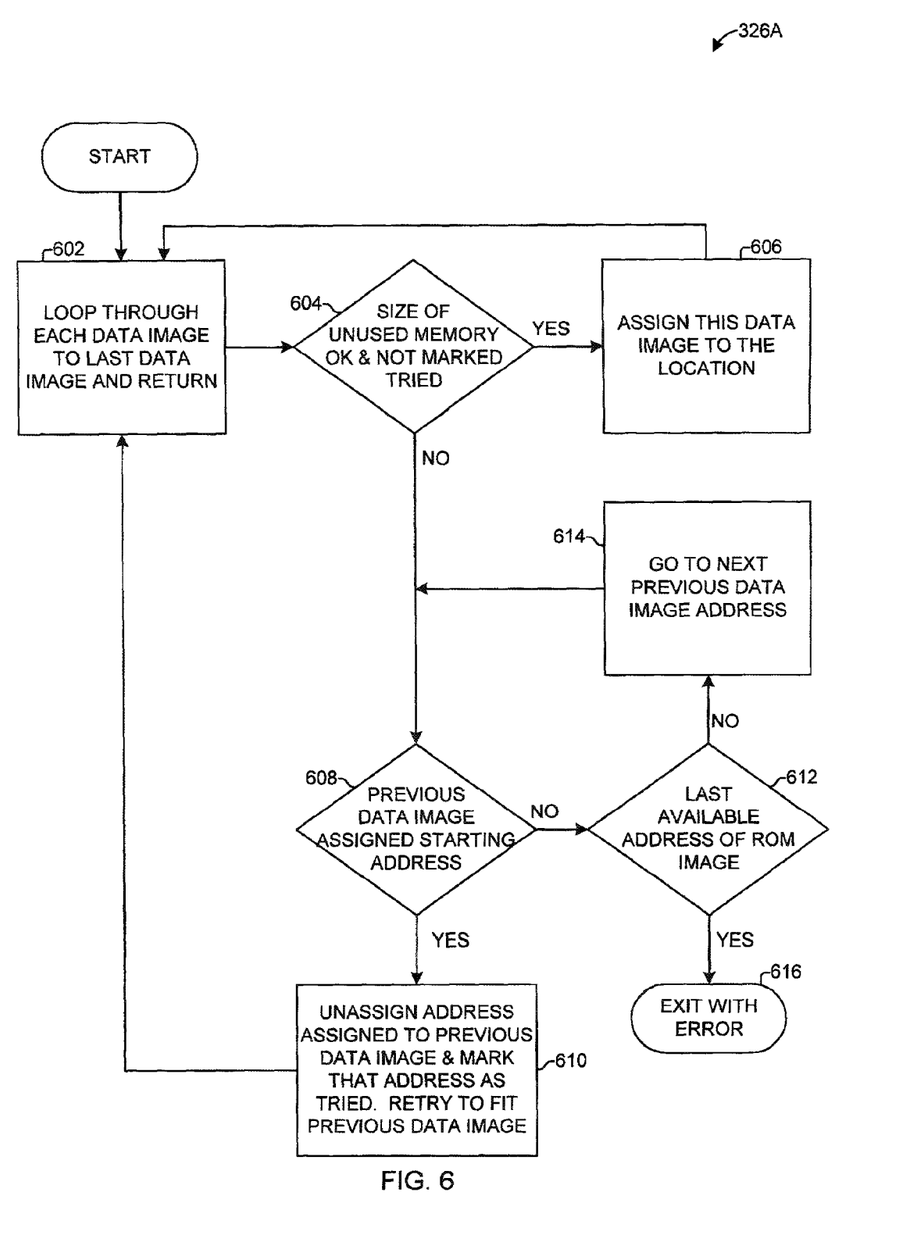
FIG. 6 is a flow diagram illustrating a data image starting address conflicts process in accordance with an embodiment of the present invention.

If no address conflict exists at step 322, data images that do not have a set starting address are assigned a starting address at step 326. These addresses are assigned by iterating through each combination of unused locations in the ROM image and assigning a location until either a match is detected or no combination is found. FIG. 6 depicts an exemplary embodiment of an address assignment process.

If no combination is found at step 326, addresses are evaluated for conflicts at step 328. If a conflict exists, the process exits with an error at step 330. If a combination is located at step 326, then no address conflict is found at step 328, and the data images are written to the ROM image at step 332.

Figure 7:
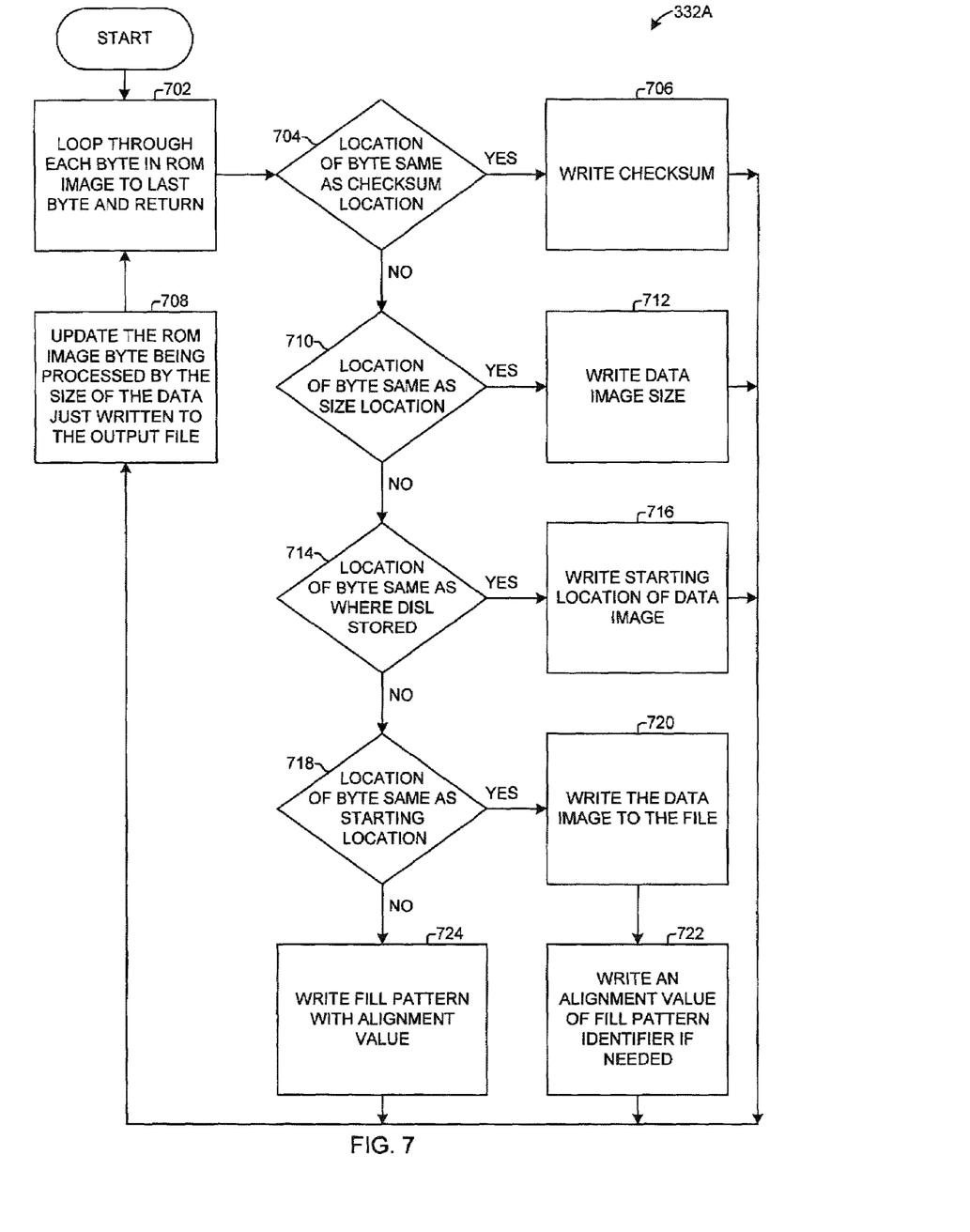
FIG. 7 is a flow diagram illustrating a data image write operation in accordance with an embodiment of the present invention.

When the data images are written to the ROM image, a data image output file is opened, and the first byte of the output file is the same location as the first byte of the ROM image. The process loops through each ROM image byte, and the appropriate data for each data image is written to the ROM image. This data for the data image may include the data image itself, the data image size, the data image location, and/or the data image checksum. Other data for data images may include executable code for a programmable device, data used in the execution of the ROM image, or other data. If a location is found that is not occupied by any data, the fill pattern with the alignment value is written to the ROM image. Alternately, a fill pattern with an alignment value may be written to the ROM image, and then the appropriate data for each data image may be written to the ROM image. The output file is closed when the last byte of the ROM image is processed. An exemplary embodiment of a data image writing process is depicted in FIG. 7.

After the output file is closed, the checksum for the entire ROM image is computed at step 334 and written to the ROM image. The process then exits at step 310. A programming system, such as the device 110 of FIG. 1, may be configured to transfer the ROM image to a memory, such as a ROM, a PROM, an EPROM, or an EEPROM.

FIG. 4 depicts an exemplary embodiment of a data image parameter process. The data image parameter process 320A loops through each data image to generate the data image parameters at step 402. The size of each data image is computed at step 404. Each data image size is padded with an alignment value to align the data image at the requested boundary at step 406 (when requested and/or necessary). The checksum, CRC, or other validating signature of the data image with the alignment value added, if any, is determined at step 408. Optionally, the checksum is masked at step 410. When the mask is selected, for example, the upper 32 bits of the checksum may be masked. Other mask processes may be used. The process 320A then returns to loop through the next data image at step 402.

FIG. 5 depicts an exemplary embodiment of an address conflict check process. The address conflict check process 322A loops through each data image at step 502. If the data image starting address conflicts with another data image's starting address at step 504, the conflict is identified at step 506. If a data image checksum location conflicts with another data image checksum location at step 508, a conflict is identified at step 506. If a data image address location conflicts with another data image's address location at step 510, a conflict is identified at step 506. If a data image size location conflicts with another data image's size location at step 512, a conflict is identified at step 506. If no conflicts are identified at steps 502, 508, 510, or 512, the process 322A loops through the next data image at step 502.

FIG. 6 depicts an exemplary embodiment of a data image address assignment process. The address assignment process 326A loops through each data image at step 602. This process is completed for those data images to which a starting address is allocated dynamically. At step 604, when a section of memory in the ROM image is open, and if that memory section is not marked as tried, then the data image is assigned to this memory location at step 606. A section of memory in the ROM image is open if no data image or associated parameters currently are stored therein. A memory section is not marked as tried if the address assignment process has not already attempted to select this memory location for storage.

If the memory location is not sufficient to hold the selected data image or the selected parameter, or if this memory location is marked as tried for the selected data image at step 604, the process 326A determines if any previous data image is assigned to this starting address at step 608. Since the address locations are selected sequentially prior to the process moving to step 608, any open and available block of memory will be selected. However, this iterative process occurs within step 604, and moving to step 608 presumes that no other open block within the ROM image is sufficient.

At step 608, a determination is made whether a previous data image is assigned the current starting address of the ROM image and whether the current data image will fit within the space identified by the current starting address. If so, the previous data image is unassigned to the current starting address of the ROM image, the current data image is assigned to the current starting address, and the current starting address is marked as tried for the previous data image at step 610. The process 326A loops to step 604 to attempt to fit the previous data image for a new starting address.

At step 608, if the previous data image is not assigned the current starting address, and if the last starting address of the ROM image has not been selected (to determine if the current data image will fit) at step 612, the next previous address is selected at step 614. The process iteratively continues at step 608 until the last available address of the ROM image is viewed at step 612. If the process gets to the last previous image having the last previous starting address at step 612, and the current data image cannot be assigned to that starting address, the process 326A will exit with an error at step 616.

FIG. 7 depicts an exemplary embodiment of a data image write operation. The data image write operation 332A loops through each byte in the ROM image at step 702. If a location of the byte in the ROM image being processed is the same as a parameter location of a selected data image, the data image write operation 332A writes the parameter location to the byte being processed. The parameter locations may include a checksum location, a size location, a storage location at which a data image starting location is stored, a starting location, or other parameters.

Referring to FIG. 7, if the location of the byte in the ROM image is the same as the checksum location of the data image, the checksum location is written to that byte at step 706. The ROM image byte being processed is updated by the size of the data just written to the output file at step 708. The process then loops through to the next byte in the ROM image at step 702. If the location of the byte is not the same as the checksum location for the data image at step 704, but the location of the byte is the same as the size location of the data image at step 710, then the data image size is written in that byte at step 712. The ROM image byte is updated at step 708, and the process 332A loops through to the next byte in the ROM image at step 702.

If the location of the byte is not the same as the size location of the data image at step 710, but the location of the byte is the same as where the data image starting location is stored at step 714, the starting location of the data image is written to the ROM image at step 716. The ROM image byte is updated at step 708, and the process loops through to the next byte in the ROM image at step 702.

If the location of the byte is not the same as where the data image starting location (DISL) is stored at step 714, but the location of the byte is the same as the starting location of the data image at step 718, then the data image is written to the file at step 720. An alignment value of a selected fill pattern is written to the ROM image at step 722, if requested and required. The ROM image byte is updated at step 708, and the process loops through to the next byte in the ROM image at step 702.

If the location of the byte is not the same as the starting location of the data image at step 718, then an alignment value of a fill pattern is written to the ROM image at step 724. The ROM image byte is updated at step 708, and the process loops through to the next byte in the ROM image at step 702 until complete.

Figure 8:
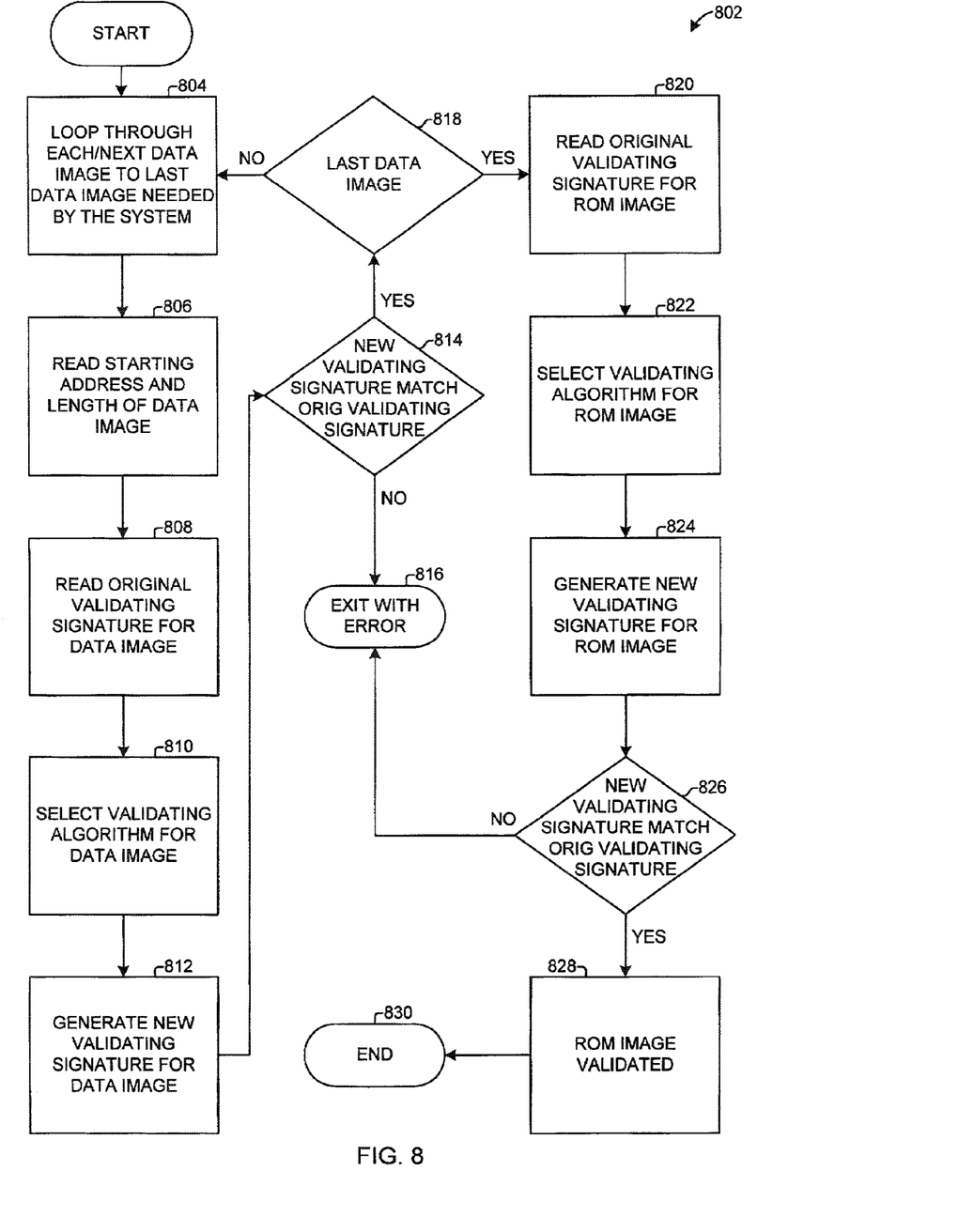
FIG. 8 is a flow diagram illustrating a ROM validating process in accordance with an embodiment of the present invention.

FIG. 8 depicts an exemplary embodiment of a ROM validating process. The ROM validating process 802 may be used to validate a ROM image stored on a ROM. For example, the ROM validating process 802 may be used to validate the ROM image or one or more data images after the ROM image is stored within the ROM, such as after a computing system is moved. Alternately or additionally, the ROM validating process 802 may be used to validate separately one or more data images in the ROM image. It will be appreciated that the ROM validating process 802 has an associated ROM validation module.

The ROM validating process starts at step 804 by looping to a first selected data image on the ROM image. While the first selected data image typically has a starting address at the first byte of the data images in the ROM image, any data image may be selected.

The entire ROM image may not require validation. In some instances, only a portion of the ROM image will require validation and only one or more data images will require validation. This may occur when only selected data images on the ROM image are needed for a computer system or another system to operate. For example, a ROM image may contain three sections, each containing code for a different operation. In a particular instance, possibly only two of the three sections may be needed for operation. Thus, the ROM validating process 802 can selectively validate, or not validate, one or more of the sections of the ROM image, i.e. one or more of the data images, thereby expediting validation.

The starting address and the length of the data image are read at step 806, and the original data image validating signature is read at step 808. Other parameters of the data image may be read in other embodiments. For example, the type of validating signature may be identified as a data image parameter. However, if not specified, the type of validating signature is determined at step 808. In some embodiments, the validating signature for the data image may be a checksum, a CRC, or a result of a key-based encryption algorithm, such as a private key for use with a public key encryption algorithm. Other types of validating signatures exist.

A data image validating algorithm is selected to generate a new data image validating signature at step 810. The data image validating algorithm is selected based on the data image validating signature type identified in step 808. The new data image validating signature is generated at step 812, and the new data image validating signature is compared with the original data image validating signature from the ROM image at step 814. If the new data image validating signature does not match the original data image validating signature at step 814, the process 802 exits with an error at step 816. Alternately, the process 802 may be configured to restart or repeat steps 806–814, or a subset of those steps, if the original and new data image validating signatures do not match. Alternately, the process 802 may be configured to note that the original and new data image validating signatures did not match, skip that data image, and loop to the next data image at step 804. Remedial measures may be taken for the skipped data image.

If the original and new data image validating signatures match at step 814, and if the data image just processed was not the last data image in the ROM image at step 818, the process 802 loops to the next data image in the ROM image at step 804. If the data image just processed was the last data image in the ROM image at step 818, the process moves to step 820.

At step 820, the original validating signature for the ROM image is read. The type of validating signature may be specified as an optional parameter. However, if not specified, the type of validating signature is determined at step 820. In some embodiments, the validating signature for the ROM image may be a checksum, a CRC, or a result of a key-based encryption algorithm, such as a private key for use with a public key encryption algorithm. Other types of validating signatures exist.

A validating algorithm is selected to generate a new ROM image validating signature at step 822. The ROM image validating algorithm is selected based on the ROM image validating signature type identified in step 820. The new ROM image validating signature is generated at step 824, and the new ROM image validating signature is compared with the original ROM image validating signature from the ROM image at step 826. If the new ROM image validating signature does not match the original ROM image validating signature at step 826, the process 802 exits with an error at step 816. If the new ROM image validating signature matches the original ROM image validating signature at step 826, the ROM image is valid at step 828, and the process exits at step 830.

The processes identified in steps 820–830 are optional. Additionally, the processes at steps 820–830 may be in a separate process or module from the processes at steps 804–818. If the processes at steps 820–830 are in a separate process or module or otherwise are not included, the ROM validating process 802 will end after the last data image validating signature for the last data image is determined at 818. Other embodiments for the ROM validating process 802 exist.

Those skilled in the art will appreciate that variations from the specific embodiments disclosed above are contemplated by the invention. The invention should not be restricted to the above embodiments, but should be measured by the following claims.

What is claimed is:

1. A method for generating a ROM image comprising at least one data image build comprising:
    processing an input file to identify at least one data image for a ROM image build and to generate a token file comprising at least one token for the data image;
    processing the data image with its associated token file to create the data image build;
    generating a data image build validating signature for the data image build;
    writing the data image build and the data image build validating signature to the ROM image;
    generating a ROM image validating signature for the ROM image; and
    aligning the data image using a fill pattern and an alignment value prior to validating the data image.

2. A method for generating a ROM image comprising at least one data image build comprising:
    processing an input file to generate a token file with a first image identifier and a temporary token file with a second image identifier, the token file and the temporary token file each representing tokens for each data image identified in the input file;
    comparing the token file with the temporary token file and, if the same, generating a data image validating signature for each data image;
    writing each data image and each data image validating signature to the ROM image, and, thereafter, generating a separate ROM image validating signature for the ROM image; and aligning at least one data image using a fill pattern and an alignment value prior to validating the data image.

3. A method for generating a ROM image comprising at least one data image build comprising:

processing an input file to generate a token file and a temporary token file, the token file and the temporary token file each representing tokens for each data image identified in the input file;

comparing the token file with the temporary token file and, if the same, generating a data image validating signature for each data image;

writing each data image and each data image validating signature to the ROM image, and, thereafter, generating a separate ROM image validating signature for the ROM image; and looping through each data image to compute a size of each data image, to align each data image, if necessary, and to generate a validating signature for each data image.

4. A method for generating a ROM image comprising at least one data image build comprising:

processing an input file to generate a token file and a temporary token file, the token file and the temporary token file each representing tokens for each data image identified in the input file;

comparing the token file with the temporary token file and, if the same, generating a data image validating signature for each data image;

writing each data image and each data image validating signature to the ROM image, and, thereafter, generating a separate ROM image validating signature for the ROM image; and looping through each byte in the ROM image and, if a location of the byte in the ROM image being processed is the same as a parameter location of a selected data image, writing the parameter location to the byte in the ROM image being processed.

5. The method of claim 4 wherein the writing the parameter location step comprises writing at least one member of a group consisting of a validating signature location, a size location, a storage location at which a data image starting location is stored, and a starting location.

6. A method for generating a ROM image using inputs from an input file comprising:

identifying a plurality of data images to be placed in the ROM image based upon the inputs from the input file;

generating a data image validating signature for each data image with each associated input;

writing each data image and data image validating signature to a starting address of the ROM image, at least one starting address being dynamically allocated, and, thereafter, generating a ROM image validating signature for the ROM image;

transmitting the data images with the data image validating signatures and the ROM image validating signature to a memory for storage as the ROM image; and aligning at least one of the data images using a fill pattern and an alignment value prior to generating the data image validating signature for the at least one data image.

* * * * *